Patented Apr. 16, 1940

2,197,045

UNITED STATES PATENT OFFICE 2,197,045

VAT DYESTUFFS

Ernst Honold, Frankfort-on-the-Main, Heinrich Neresheimer, Ludwigshafen-on-the-Rhine, Max Schubert, Frankfort-on-the-Main, Berthold Stein, Mannheim, and Karl Saftien, Ludwigshafen-on-the-Rhine, Germany, assignors to General Aniline & Film Corporation, a corporation of Delaware No Drawing. Application October 8, 1938, Serial No. 233,979. In Germany October 14, 1937

6 Claims. (Cl. 260—157)

The present invention relates to vat dyestuffs containing azo groups.

We have found that vat dyestuffs of valuable properties are obtained by treating with oxidizing agents vattable compounds which contain an aminoaryl group on a triazole, isothiazole or pyrazole ring.

As initial materials there may be mentioned triazoles, isothiazoles and pyrazoles which may be derived from any vattable compounds, as for example of the anthraquinone, naphthoquinone, pyrazolanthrone, isothiazolanthrone or pyrimidinoanthrone, indigo or thioindigo series and the triazole, isothiazole or pyrazole ring of which is combined with an aminoaryl group, as for example of the benzene, diphenyl or naphthalene series. The initial materials may contain further atoms or radicles resistant under the reaction conditions or also attached rings.

As oxidizing agents there may be mentioned for example chromic acid, manganic acid, permanganic acid, hypochlorous and hypobromous acids. They may be allowed to act in acid, neutral or alkaline media. In many cases it is preferable to carry out the preparation of the initial materials, for example by reduction of the corresponding nitro compounds, in one operation with their further treatment.

In so far as the amino compounds used as initial materials themselves have dyestuff properties, the oxidation to the new dyestuffs may also be carried out on the fibre, for example by treatment of the dyeing with hypochlorite solution. Nitrous acid or substances yielding the same under the reaction conditions are unsuitable for oxidation because they have a diazotizing action.

For example by vatting 4'-nitrophenyl-1.2-triazoloanthraquinone, introduction of the resulting vat of the 4' amino compound into an excess of diluted hypochlorite solution and boiling, a fast, yellow vat dyestuff is obtained.

The following examples will further illustrate how the said invention is carried out in practice but the invention is not restricted to these examples. The parts are by weight.

Example 1

A vat of 4'-nitrophenyl-1.2-triazoloanthraquinone:

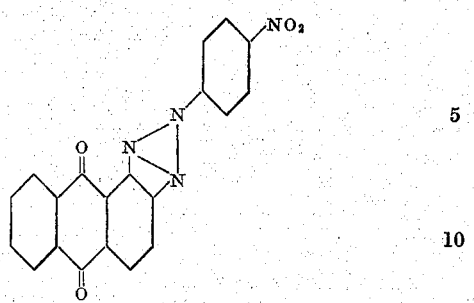

at a temperature of 50° C. and containing the leuco compound of the corresponding amine is allowed to flow into an excess of dilute sodium hypochlorite solution, the originally red-brown suspension is boiled until it has acquired a yellow-brown shade of color which no longer changes upon addition of hypochlorite solution and further boiling, and the whole is then worked up in the usual manner. The resulting new dyestuff is a dark powder. It separates from its yellow solution in a large amount of boiling trichlorbenzene in the form of short yellow needles. It dissolves in strong sulfuric acid giving a brown orange coloration. From its crimson hydrosulphite vat, yellow dyeings of good fastness are obtained.

The same dyestuff is obtained by carrying out the oxidation of the 4'-aminophenyl-1.2-triazoloanthraquinone with chromic anhydride in glacial acetic acid instead of with alkaline hypochlorite solution.

Example 2

10 parts of PyC-(4' aminophenyl)-1(N).2-pyrazoloanthraquinone:

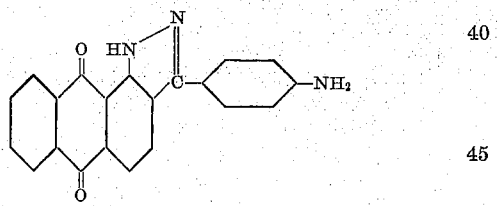

(prepared for example from 1-chlor-2-benzoylanthraquinone-4'-carboxylic acid by conversion by means of Hofmann's degradation into 1-chlor- 2-(4'-aminobenzoyl)-anthroquinone and conversion of this amine with hydrazine hydrate in pyridine) are suspended in 400 parts of glacial acetic acid. After adding 20 parts of sodium bichromate, the mixture is heated for an hour at 95° C. and the residue sucked off at from 70° to 80° C. It dissolves in strong sulfuric acid giving a reddish yellow coloration and yields on cotton brownish orange dyeings from a brownish yellow vat.

*Example 3*

A dilute sodium hypochlorite solution is added to a boiling, aqueous suspension, slightly acidulated with acetic acid, of finely divided PyC.4'-(4''-amidodiphenyl)-1(N).2-pyrazoloanthraquinone:

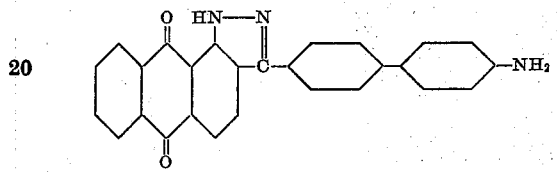

(prepared for example by the reaction of 1-chloranthraquinone-2-carboxylic acid chloride with 4-acetaminodiphenyl in the presence of anhydrous aluminum chloride, splitting off of the acetyl group and reaction of the resulting 1-chlor-2-(4'-para-aminophenyl)-benzoylanthraquinone with hydrazine hydrate in pyridine) until the original red suspension has acquired a yellow shade which no longer changes upon the further addition of hypochlorite solution and longer boiling. The mixture is then worked up in the usual manner. The new dyestuff is a red-yellow meal which dissolves in strong sulfuric acid giving a crimson coloration. It dyes cotton brownish orange shades from a golden yellow vat.

*Example 4*

A suspension of 15 parts of μ-(4'-aminodiphenyl)-2.3-isothiazoloanthraquinone (obtainable by condensing 2-chloranthraquinone-3-carboxylic acid chloride with 4-acetaminodiphenyl in the presence of anhydrous aluminum chloride according to Friedel-Crafts, splitting off the acetyl group with aqueous sulfuric acid and treating the resulting product with ammonium sulfide under superatmospheric pressure) in 750 parts of water is treated at from 85° to 90° C.

with a sodium hypochlorite solution having 10 percent of active chlorine, until the dark olive coloration of the paste has turned bright brownish orange. The dyestuff is then filtered off by suction, washed and, if desired, purified by way of its sulfate. It dyes cotton from a pale green vat yellow shades.

What we claim is:

1. A vat dyestuff of the general formula

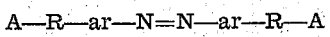

wherein the A's stand for the same anthraquinonic nuclei, R a nitrogenous five-membered ring selected from the group consisting of the triazole, isothiazole and pyrazole rings, two carbon ring members of A and R being common to both, and ar an arylene ring having up to two non-condensed benzene rings.

2. A vat dyestuff of the general formula

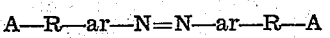

wherein the A's stand for the same anthraquinonic nuclei, R a triazole ring, two carbon ring members of A and R being common to both, and ar an arylene ring having up to two non-condensed benzene rings.

3. A vat dyestuff of the general formula

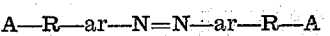

wherein the A's stand for the same anthraquinonic nuclei, R a pyrazole ring, two carbon ring members of A and R being common to both, and ar an arylene ring having up to two non-condensed benzene rings.

4. The vat dyestuff of the formula

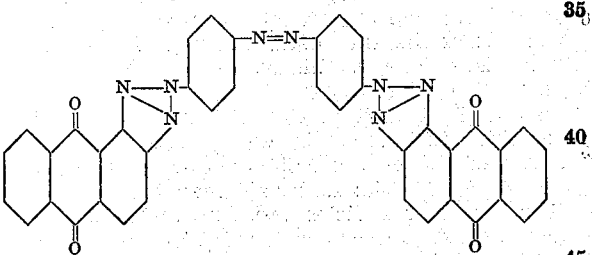

5. The vat dyestuff of the formula

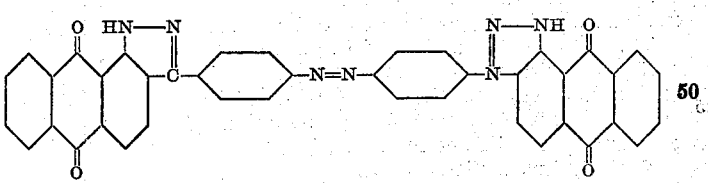

6. The vat dyestuff of the formula

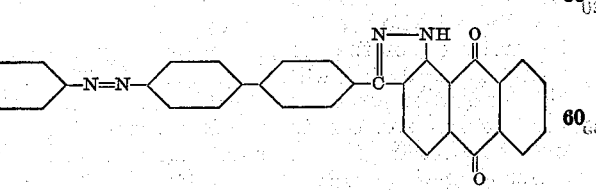

ERNST HONOLD.
HEINRICH NERESHEIMER.
MAX SCHUBERT.
BERTHOLD STEIN.
KARL SAFTIEN.